United States Patent [19]

Boissevain

[11] E Patent Number: Re. 33,741

[45] Reissued Date of Patent: Nov. 12, 1991

[54] APPARATUS AND METHOD FOR CONTROLLING THE AMOUNT OF COATINGS ON PAPER OR OTHER MATERIALS

[75] Inventor: Matt Boissevain, Los Altos, Calif.

[73] Assignee: Measurex Corporation, Cupertino, Calif.

[21] Appl. No.: 384,130

[22] Filed: Jul. 21, 1989

Related U.S. Patent Documents

Reissue of:

[64] Patent No.: 4,732,776
Issued: Mar. 22, 1988
Appl. No.: 17,833
Filed: Feb. 24, 1987

[51] Int. Cl.[5] ..... B05D 3/12

[52] U.S. Cl. ..... 427/10; 118/405; 118/407; 118/413; 118/712; 162/212; 162/259; 162/344; 162/347; 427/356; 427/361

[58] Field of Search ..... 118/405, 407, 413, 712; 427/10, 356, 361; 162/212, 259, 344, 347

[56] References Cited

U.S. PATENT DOCUMENTS

| | | | |
|---|---|---|---|
| 3,261,893 | 7/1966 | George et al. | 162/347 |
| 3,940,221 | 2/1976 | Nissel | 425/141 |
| 4,076,864 | 2/1978 | Wallsten | 427/356 |
| 4,135,006 | 1/1979 | Readal et al. | 427/9 |
| 4,252,519 | 2/1981 | Farmer et al. | 425/141 |
| 4,358,342 | 11/1982 | Nuttall | 162/259 |
| 4,358,481 | 11/1982 | Wallsten | 427/356 |
| 4,505,779 | 3/1985 | Boissevain | 162/199 |
| 4,640,742 | 2/1987 | Helleur | 162/212 |

FOREIGN PATENT DOCUMENTS

| | | | |
|---|---|---|---|
| 211648 | 10/1960 | Austria | 162/192 |
| 510552 | 6/1976 | U.S.S.R. | 162/192 |

*Primary Examiner*—Michael Lusignan
*Attorney, Agent, or Firm*—Spensley Horn Jubas & Lubitz

[57] ABSTRACT

An apparatus and a method for controlling the thickness of coatings on webs at a plurality of cross-directional positions while a coating procedure is taking place. The deflection of the metering element is controlled automatically in response to measurements of the uncoated and coated web that determine the thickness of the coating being applied at a plurality of cross-directional positions. In one preferred embodiment, a bimetallic member having a plurality of separated tongue-like extensions corresponding to cross-directional positions along the blade is used, the tongue-like extensions pressing on the back of the blade at their ends in response to heat applied dependent upon the determined thickness of the coating being applied. In another embodiment, pneumatic actuators whose pressure may be varied in response to the determined thickness are used to adjust the position of the metering element at a plurality of cross-directional positions to locally vary the thickness of the applied coating.

25 Claims, 2 Drawing Sheets

APPARATUS AND METHOD FOR CONTROLLING THE AMOUNT OF COATINGS ON PAPER OR OTHER MATERIALS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention is concerned with the field of apparatuses and methods for applying coatings to paper or other similar sheet materials, and in particular, to improvements in such wherein the thickness of the coating is monitored and regulated while being applied.

2. Background Art

In the process of making paper, it is often desirable to coat the paper with any of a wide variety of materials. For example, paper is often coated with a sizing material which is a paste-like substance, usually containing silica, for smoothing out the surface of the paper by filling in the pores that are formed between the wood pulp fibers that make up the paper. Other coatings or precoatings are applied to paper and other sheet materials during the paper-making process. For example, on specialty papers such as reprographic grades or oil/-grease-proof packaging, where uniform film forming or solvent holdout are of importance, combinations of coatings are used. As another example, adhesive materials are applied where paper is to be used as tape or labels. As used herein, "coating" includes any type of coating or sizing applied to paper or other sheet materials by the type of apparatuses discussed.

Such coatings are usually applied to paper as a part of the paper making process in a paper mill where the paper may be disposed in rolls that are on the order of 25 feet or more in the cross direction. Uniformity of coating thickness is often necessary or desirable for various reasons. For example, the printability of paper is improved by the uniform application of sizing. The coating thickness, in some cases, must be controlled to within microns or less.

Coating apparatuses or coaters come in a wide variety of configurations. One type comprises on one side a rotating backing drum and on the opposite side a metering element which may be a blade edge, both of which are oriented in the cross direction. The drum and the blade edge form a narrow slot through which the sheet of paper or other material to be coated, often termed the "web," passes. The blade presses the paper with the coating applied as it passes through the slot, removing excess coating. The web may pass either up or down through the slot depending on the configuration. The use of a long single blade rather than several shorter blades eliminates the lines that would be caused on the coated paper or other material by the slight discontinuity of adjacent blades where they meet one another.

It will be appreciated that the separation of the drum from the metering element is a critical factor in the application of such coatings. The drum is fabricated and installed to high tolerances. In order to try to control the thickness of the coatings applied to webs in such an apparatus, coaters provide a means of adjusting the position of the metering element before the process begins, usually at equally spaced intervals in the cross direction. Each adjustment usually covers an interval, known as a "slice," in the cross-direction. Each slice may be three inches or some other length. For example, in some coaters, a flexible steel blade is used as the metering element. The blade is held between blade jaws oriented in the cross-direction along a side of the blade opposite to the edge which forms the slot. Adjusting screws are disposed at selected equal intervals in the cross-direction, one per slice, and are disposed to press against the back of the blade between the blade jaws and the edge forming the slot. It will be appreciated that because the blade is a thin steel member, the blade may be slightly bent or flexed in the vicinity of an adjusting screw by adjusting the screw, thereby varying the width of the slot formed by the drum and the blade edge in that vicinity. Such adjustments of the adjusting screws are done prior to a coating procedure in order to obtain a slot of uniform width and a coating which is uniform to the extent possible. The adjusting screws can be adjusted to take into account factors that result in non-uniform coatings that are known before the coating process begins. In the case where a rod is used as the metering element, the rod may be held by aluminum supports with the adjusting screws positioned to press on the aluminum supports.

Even with coaters that include such screw adjustments at equally spaced intervals, it is still difficult to get even coatings on paper. Local variations in temperature and paper thickness, and possibly other factors, may be responsible for uneven coatings. Furthermore, while the adjustment screws may be set before a coating procedure is initiated, the adjusting screws are not adjusted during the coating procedure. Coaters may operate at speeds of 3000 feet per minute or more, and the adjusting screws are located in relatively inaccessible places, often rendering it highly impractical and unsafe, if not impossible, to manually adjust the adjusting screws during a coating procedure. The environment in which the adjusting screws is located, moreover, aside from allowing for little space, is highly unsuited to the use of precision mechanisms to permit the adjusting screws to be adjusted remotely.

It will be appreciated from the foregoing that the inability to control the separation of the metering element and the drum at a plurality of cross-directional positions during the coating procedure results in coatings which may be of less uniform thickness than would result in the case where such separation at a plurality of cross-directional positions could be adjusted while the coating procedure is taking place.

SUMMARY OF THE INVENTION

In view of the foregoing, it is an object of the present invention to provide in a coating apparatus the capability for at least to some extent independently adjusting the coating thickness at a plurality of cross-directional positions while the coating procedure is taking place, and to do so in response to measurements taken during the coating procedure indicative of the thicknesses of the uncoated and the coated sheet materials at the cross-directional positions.

It is also an object of the present invention, while providing such a capability, to be easily adaptable to a wide variety of existing coaters without the necessity of extensive modifications to the coaters, to be able to reliably withstand the environments in which coaters are located, and to be able to be implemented in the small spaces generally available.

The present invention provides a means for controlling the deflection of a metering element at a plurality of cross-directional positions while a coating procedure is taking place. The deflection of the metering element is controlled automatically in response to measurements of the uncoated and coated web that determine the thickness of the coating being applied at a plurality of cross-directional positions.

In one preferred embodiment of the present invention applicable to coaters in which the metering element is a blade, rod, bar or other member, and described with respect to a steel blade used as the metering element, a bimetallic member having a plurality of separated tongue-like extensions corresponding to cross-directional positions along the blade is used. The tongue-like extensions press on the back of the blade at their ends and are provided with separately controlled heating elements. Through the application of heat by the heating elements to the bimetallic tongue-like extensions, due to the difference in thermal expansion between the two layers of the bimetallic member, the ends of the tongue-like extensions are displaced by amounts corresponding to the temperatures of the tongue-like extensions. The displacement of the end of a tongue-like extension causes the blade to deflect a corresponding amount, thereby correspondingly adjusting the width of the slot at that cross-directional position.

Two scanning basis weight gauges are used to determine the thickness of the web being coated before and after it is coated. The corresponding information for each cross-directional position from the two basis weight gauges is compared to derive a signal indicative of the thickness of the coating being applied at the cross-directional position. A computer compares this signal with one representing the desired coating thickness which has previously been entered into the computer for the particular coating procedure and generates a control signal that is used to regulate the heating element for the tongue-like extension corresponding to the particular cross-directional position. This is done for all cross-directional positions. Should conditions arise during the coating procedure which require an adjustment of the deflection of the metering element at any cross-directional position in order to maintain the applied coating at a preselected thickness, such an adjustment will be made automatically upon detection of its need. A higher degree of uniformity in the thickness of coatings applied to webs is therefore achievable.

In another embodiment of the present invention, a bimetallic metal blade is used as the metering element. Heaters are attached to the blade at equal intervals in the cross-direction and are separately controllable by control signals which are obtained in the same manner as described with respect to the above-described embodiment. Alternatively, a blade that is not bimetallic may be used where less total adjustment of the deflection of the blade is needed. Since the heaters are positioned only on one side of the blade, a thermal gradient is created across the blade causing greater thermal expansion on the side of the blade to which the heater is attached than the other side. The difference in thermal expansion results in a very slight displacement of the edge of the blade relative to the drum.

Another embodiment of the present invention employs pneumatic actuators to adjust the deflection of the metering element at equally spaced intervals in the cross-direction. In one form of this embodiment, the metering element comprises a bar or rod held in a metal support structure. An expandable air chamber is located between the support and the bar at each cross-directional position, corresponding to one slice intervals, and is controllably inflatable. The expansion by inflation of the air chamber pushes the metering bar away from the support an amount dependent upon the air pressure in the air tube. The air chambers are separately controlled with respect to applied air pressure to deflect the metering element controlled amounts at each cross-directional position. As in the other embodiments of the present invention previously referred to, control signals, which in this case regulate the air pressure applied to each inflatable air chamber, are derived from measurements of the thicknesses of the uncoated and coated web at the corresponding cross-directional positions during the coating procedure. One form of this embodiment uses a tubular assembly made of an elastomer material in which the individual air chambers are formed along the length of the member, the individual air chambers being separated by relatively thick portions of elastomer material which serve to isolate the effects of changes in air pressure in one of the air chambers from adjacent air chambers. Each air chamber is provided with a separate inlet, and tubing connects the inlets to an interface at which the air pressure for the individual air chambers is controlled. The particular embodiment described may be used in connection with existing coaters which presently use a single air tube extending in the cross-direction in order to load the metering element. It has significant advantages in that individual air chambers are provided at a plurality of cross-directional positions, and are separately controllable. Pneumatic actuation can be used as well with metering elements other than bars or rods, such as blades.

DESCRIPTION OF PREFERRED EMBODIMENTS

The following descriptions of the present invention are not to be taken in a limiting sense, but are made merely for the purpose of illustrating the general principles of the invention, since the scope of the invention is best defined by the appended claims. The following detailed descriptions are of the best presently contemplated modes of carrying out the present invention.

Figure 1:
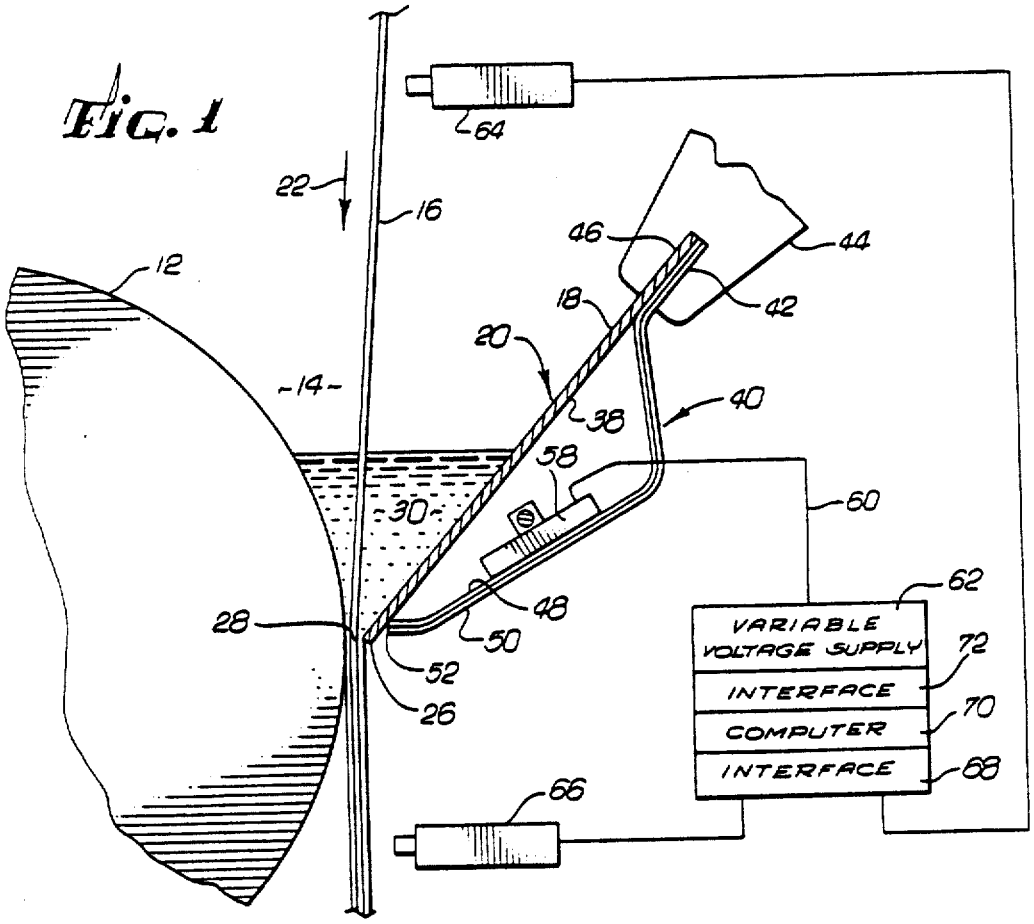
FIG. 1 is a cross-sectional, schematicized and simplified view of a preferred embodiment of the present invention in which bimetallic tongues are temperature-controlled in order to regulate the deflection of a metering element on a coater at equally spaced intervals in the cross-direction.
Figure 2:
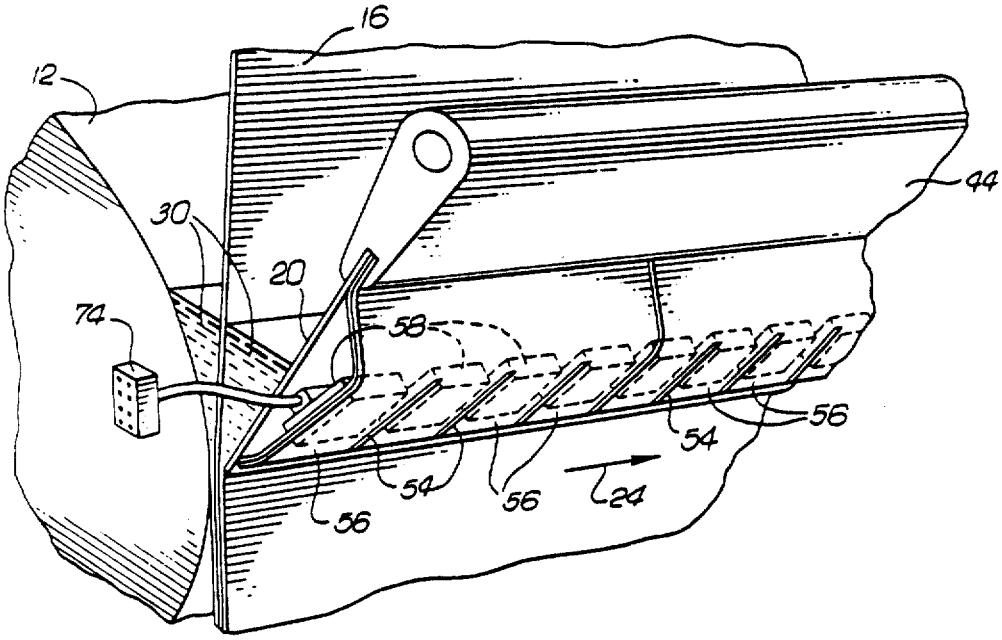
FIG. 2 is a partial schematicized and simplified perspective view of the embodiment of FIG. 1.

A first preferred embodiment of the present invention can be understood with reference to FIGS. 1 and 2.

The present invention will be described with respect to the application of a coating material to paper. However, the present invention is not limited to use with paper or the specific coatings that are placed on paper, but may be used with other sheet materials as well as the materials used for coating such sheet materials. The coatings, including sizing, that are applied to paper are applied during the paper-making process in paper mills. One or both sides of the paper may be coated. Many of the procedures used during the paper making process are carefully regulated so that the paper 16 to be coated travelling in the direction of arrow 22 in FIG. 1 has uniform qualities both in the machine direction (the direction indicated by arrow 22 in FIG. 1) as well as in the cross-direction (the direction into the drawing in FIG. 1 or the direction of arrow 24 in FIG. 2). However, variations do occur. With respect to the present invention, variations in the thickness of the paper both in the machine and in the cross-directions are of significance, as coating apparatuses are required to apply a coating of even thickness to the paper. This becomes a virtual impossibility if the paper thickness is changing or if a change in temperature causes the metering element to displace slightly and no compensating adjustment is being made, as in the prior art apparatuses. With the present invention, this shortcoming of the prior art apparatuses is overcome. The present invention need not be embodied in a completely new coater, but may be implemented with existing coaters. The descriptions herein are with respect to coaters having other attributes and characteristics similar in general to existing coaters.

A cylinder or drum 12 forms one side of a container area 14 for holding a coating material to be placed on a web, such as paper 16. The opposite side of area 14 is formed by the side 18 of flexible blade 20.

The drum 12 and the edge 26 of flexible blade 20 from a narrow slot 28 extending in the cross-direction through which the paper 16 exits the container area 14. Coating material 30, in a liquid form, is disposed in container area 14. If both sides of the paper 16 are to be coated, the coating material 30 is disposed on both sides of the paper 16 as shown in the figures, while if only one side is to be coated, the coating material 30 would be disposed on the right side of the paper 16 shown in FIGS. 1 and 2. Paper 16 is transported through the coating material 30 and slot 28 in the direction of arrow 22, the separation of cylinder 12 and the edge 26 of flexible blade 20 determining the total thickness of paper 16 and coating material 30 which exits the container area 14. It will be appreciated that if the separation between drum 12 and the edge 26 of flexible blade 20 remains constant during a coating procedure but the thickness of the paper 16 changes slightly, the thickness of the coating applied to the paper 16 will not be uniform; if the paper becomes thicker, a correspondingly thinner layer or layers of coating material 30 on the paper 16 can exit the slot 28.

Before the present invention, because the drum 12 and flexible blade 20 could extend in the cross-direction 25 feet or more and the blade may in some instances only be on the order of 0.016 inches in thickness, coating apparatuses provided adjustment mechanisms that could be set before a coating procedure. These mechanisms adjusted the width of the slot at six-inch intervals along the slot 28 in the cross-direction. For example, the embodiment of the present invention shown in FIG. 5, to be described subsequently, shows an adjusting screw assembly 334. These assemblies 334 are located at equally spaced intervals in the cross-direction and are for pressing on an aluminum support 304 carrying a bar 302 as a metering element. In a coating apparatus using a flexible blade 20, such as is shown in FIGS. 1 and 2, the adjusting screw mechanism would be disposed to press on the side 38 of flexible blade 20 to slightly adjust the width of the slot 28 for each cross-directional slice. The adjusting screw mechanisms cause the edge 26 of a flexible blade 20 to be displaced predominantly within the particular slice where the adjusting screw mechanism is located. Hence, somewhat independent, minor adjustments in the separation of edge 26 from drum 12 in each slice can be made. While the adjusting screw mechanisms may be adjusted to form the slot 28 of predetermined width at each slice, it will be realized that they cannot be satisfactorily adjusted while a coating procedure is going on, as previously discussed.

With the present invention, an automatic adjustment to the width of the slot 28 in localized areas in the cross-direction can be made. In the first preferred embodiment, bimetallic members 40 extend along the length of flexible blade 20 and are located side-by-side along the entire length of flexible blade 20. Each bimetallic member 40 corresponds to two slices in the cross-direction. Each bimetallic member 40 has a mounting flange 42 which extends in the cross-direction. Preferably, bimetallic members 40 are mounted by mounting flanges 42 in blade holder 44 with flexible blade 20. In this preferred embodiment, flexible blade 20 and blade holder 44 may be of the type that have been used with coating apparatuses of the prior art with the modification that the mounting slot 46 in blade holder 44 is able to accommodate both flexible blade 20 and the mounting flanges 42. It will be appreciated that the invention is also applicable to blade holders that are jaws as well as to other systems and that the specific characteristics described are only for purposes of illustration, and should not be understood to limit the types of coaters with which the present invention is usable.

Each bimetallic member 40 has a cross-sectional shape, as shown in FIG. 1, in which bimetallic member 40 bends away from flexible blade 20 at the mounting flange 42 and then back toward the end of flexible blade 20. In the preferred embodiment, bimetallic member 40 is comprised of a first thin layer [48] *50* of higher thermal expansion formed of 18% nickel, 11% chromium with the balance iron which is bonded to a second thin layer [50] *48* of lower thermal expansion formed of 26% cobalt, 20% nickel, 7½% chromium with the balance iron. Other corrosion resistant bimetal structures may be used. Bimetallic sheets of material from which bimetallic members 40 can be formed are commercially available. Such sheets may be on the order of 0.050 inches in thickness. The figures are not intended to depict to scale the elements shown. In particular, bimetallic member 40 would typically be thicker than flexible blade [26] *20*, which may be very thin, as previously mentioned.

Centered at 3 inch intervals along the length of bimetallic member 40 in the cross-direction are located slots 54, which extend from the edge of bimetallic member 40 opposite the mounting flange 42 in a direction perpendicular to the cross-direction to define tongues 56 separated by the slots 54. The ends 52 of the tongues 56 engage flexible blade 20 on side 38 near the edge 26.

Mounted on the stainless steel layer 48 of each tongue 56 of bimetallic member 40 is a heater element 58. It will be appreciated that as tongue 56 is heated by heater element 58, the end 52 of the tongue 56 engaging blade 20 will be displaced due to the unequal coefficients of thermal expansion of the stainless steel alloy layers 48 and 50 making up the bimetallic member 40. The more heat applied to tongue 56 by heater element 58, the more the end 52 of tongue 58 will displace against flexible blade 20. The end 52 of tongue 56 in fact pushes on the end of flexible blade 20 so that edge 26 becomes closer to drum 12 in the area of tongue 56 when more heat is applied raising its temperature. By controlling temperature in tongue 56 by in turn controlling heater element 58, the displacement of the end 52 of tongue 56 and therefore the width of slot 28 in the vicinity of tongue 56 can be controlled.

The flexible blade 20 and the bimetallic members 40 are configured and mounted so that in the absence of any conditions causing any of the tongues 56 of the bimetallic member 40 to increase in temperature above the environment, the ends 52 of the tongues 56 of bimetallic member 40 exert a slight pressure against the end of flexible blade 20. Each of the heater elements 58 generates heat in proportion to the voltage applied to it along leads 60 from a controllable voltage source 62 capable of supplying a selected variable voltage to each of the heater elements 58. Commercially available resistance heaters encased in silicone rubber or special plastics may be used for heater elements 58. Such heater elements may be mounted to tongues 56 using available adhesives that can withstand the temperatures achieved.

For the described embodiment, temperatures on the order of 200° F. are estimated.

The specific ratings of the heater elements 58 used will depend upon the specific configuration. For the configuration described, for example, it is estimated that a heater with a rating on the order of 20 watts would be suitable.

In order to determine the thickness of the paper 16 both before and after it is coated, scanning basis weight gauges which scan in the cross-direction are used. Scanning basis weight gauges and their method of deployment are well known in the paper making industry and will not be described in detail here. One type of basis weight gauge that can be used uses gamma rays to measure the thickness of paper as it scans in the cross-direction.

In the present invention, a first scanning basis weight gauge 64, representationally shown, is located so as to scan across the paper 16 cross-directionally before the paper 16 is coated. A second basis weight gauge 66, also representationally shown, is located so as to scan across the paper cross-directionally after the paper has exited through slot 28. The purpose of first and second scanning basis weight gauges 64 and 66 is to determine the thickness of the coating being applied at each cross-directional position at which the deflection of flexible blade 20 is adjustable.

The signals from the first and second scanning basis weight gauges are fed, through an appropriate interface 68, to a computer 70. The computer 70 uses these signals, as well as the value of the desired thickness of the coating to be applied during a coating procedure, to determine the thickness of the coating applied and to generate the control signals for the controllable voltage supply 62, which signals are applied through the appropriate required interface 72. These control signals cause the voltages being applied to the corresponding heater elements 58 to be varied as required in order that the edge 26 of the flexible blade 20 at the corresponding cross-directional position is appropriately displaced to vary the thickness of the coating applied at that cross-directional position.

With this embodiment of the present invention, when the signals from the basis weight gauges 64 and 66 indicate that too little or too much coating material is being applied at a particular cross-directional position, the appropriate control signal is generated by computer 70 to adjust the heat being supplied by the heater element 58 disposed on the tongue 56 corresponding to the portion of the edge 26 at that cross-directional position. Since this can be done during the coating procedure at each of the cross-directional positions, the coating applied to the paper can be kept uniform in thickness despite conditions which would otherwise result in a non-uniform thickness.

In the preferred embodiment, 12-inch modules comprising a bimetallic member 40 having four tongues 56 and four corresponding heaters 58 with their associated leads attached to a connector 74 are used. Precise control is obtained by locating the tongues 56 and heater elements 58 at the 3-inch intervals of the adjusting screws. In the event of the failure of one of the heaters, the entire module may be removed from the coating apparatus and replaced by a completely operational module.

Figure 3:
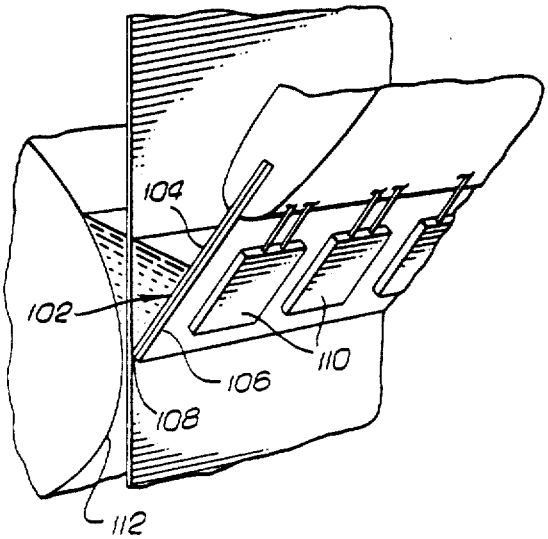
FIG. 3 is a partial schematicized and simplified perspective view of another embodiment of the present invention in which the deflection of a bimetallic blade serving as the metering element is controlled by heaters attached to the blade at equally spaced intervals in the cross-direction.

A second preferred embodiment of the present invention can be understood with reference to FIG. 3. FIG. 3 is a partial representational view in perspective of the second preferred embodiment. In this form of the invention, the blade 102 itself is bimetallic. The top layer 104 of blade 102 is steel or a stainless steel alloy while the bottom layer 106 of blade 102 is a different stainless steel alloy. The edge 108 of the blade 102 is stainless steel. Heater elements 110 are mounted on the layer 106 of blade 102 and are of the same type and used in the same manner as has been indicated with respect to the first preferred embodiment. The application of heat by a heater element 110 will cause the edge 108 of blade 102 to curve inward, i.e., toward the drum 112 in the vicinity of the heater element 110 as more heat is applied by that heater element.

FIG. 3 does not shown components of the embodiment such as the first and second basis weight gauges 64 and 66 and the computer 70, since the second preferred embodiment is identical to the first preferred embodiment for representational purposes in these respects.

Figure 4:
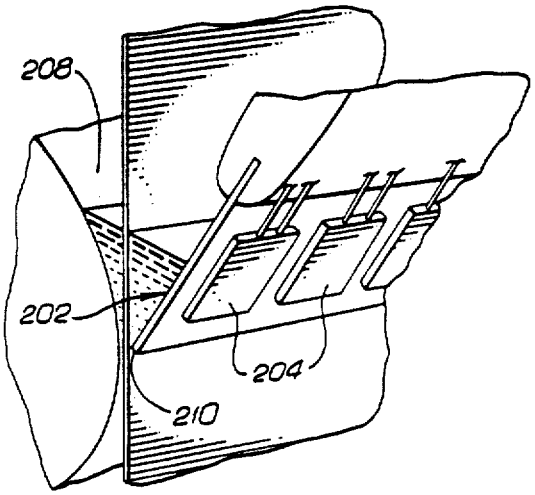
FIG. 4 is a partial schematicized and simplified perspective view of an embodiment of the invention similar to that shown in FIG. 3 in which thermal gradients created across a steel or stainless steel blade are controlled by heaters attached to the blade at equally spaced intervals in order to regulate the deflection of the blade.

Alternately, as shown in FIG. 4, rather than a bimetallic blade, a blade 202 formed of steel or stainless steel may be used. The heater elements 204 are mounted on the outside of the blade 202 away from the coating material or sizing disposed between the drum 208 and the blade 202. The outside surface of blade 202, when heated by a heating element 204, is of a higher temperature than the inside surface and a slight deflection of the edge 210 of the blade 202 inward will take place. The cooling effect of the coating or sizing on the inside surface of blade 202 will enhance this effect. The other components of this embodiment of the present invention may be as set forth with respect to the first and second embodiments.

Embodiments of the present invention using thermal effects, as the embodiments described above, are not limited to coaters in which web travel is downward.

Figure 5:
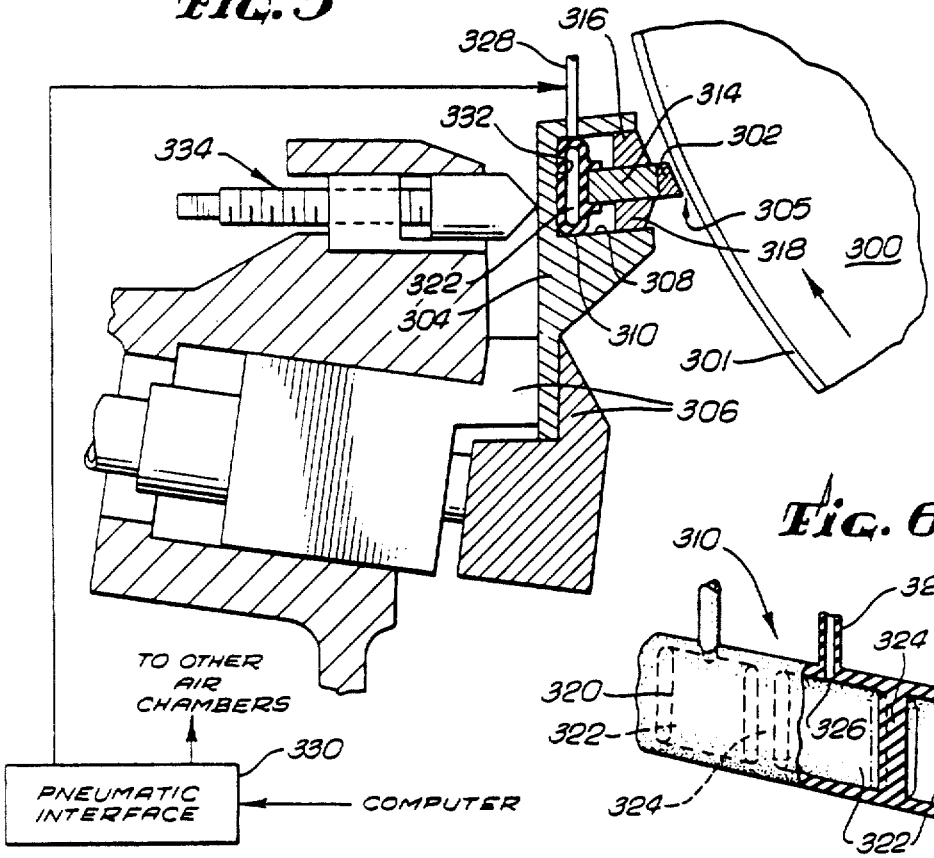
FIG. 5 is a cross-sectional, schematicized and simplified view of an embodiment of the present invention in which a plurality of air chambers are controlled as to their air pressure in order to regulate the deflection of a metering element in a coater.
Figure 6:
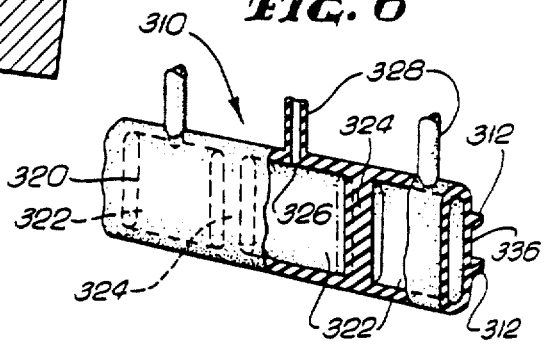
FIG. 6 is a partial perspective view of the pneumatic actuator assembly of the embodiment of the invention shown in FIG. 5.

A fourth embodiment of the present invention uses pneumatic rather than thermal effects and can be understood with reference to FIGS. 5 and 6. The fourth preferred embodiment of the present invention is described with respect to a coating apparatus in which the coating or sizing is applied as the paper moves generally upward through the apparatus.

While this embodiment of the present invention is described with respect to its use with a Jagenberg Hydro-Bar metering system, it is not limited to use with such systems, but may be used with a wide variety of systems. In addition to being used with metering elements comprising bars, as described with respect to this preferred embodiment, the pneumatic actuator described for adjusting the deflection of the metering element during a coating procedure may be employed with a wide variety of other coating apparatuses in which paper is transported generally downward during the coating procedure as well as upward.

In this embodiment, as can be seen in FIG. 5, the web 301 moves upward through a slot 305 formed between the drum 300 and the metering element 302. Coating material is splashed or otherwise applied to web 301 before web 301 traverses the slot 305.

In the fourth preferred embodiment, the metering element is a machined bar 302 having some flexibility and shown representationally in FIG. 5. The bar 302 is mounted on metal support 304 which in turn is mounted between jaws 306 on the coating apparatus. Support 304 contains a pocket 308 which extends in the cross-direction in the support 304 and is configured to carry the components for mounting and loading bar 302. Pneumatic actuator assembly 310, to be described in more detail subsequently, is situated in the bottom of pocket 308 and extends in the cross-direction. A pair of guide ridges 312 extending from a side of the pneumatic actuator assembly 310 outward toward the open side of pocket 308 also extend in the cross-direction. The pair of guide ridges 312 are separated to accommodate therebetween one end of a piston 314, the other end of which is attached to bar 302. Upper and lower guide blocks 316 and 318, respectively, prevent lateral motion of piston 314 and bar 302.

The pneumatic actuator assembly 310 is shown in more detail in FIG. 6, in which a perspective view of a portion of the pneumatic actuator assembly 310 is presented. Pneumatic actuator assembly 310 comprises an elongated generally flattish tubular member 320 about 12 inches long formed of an elastomer material and having four individual air chambers 322 formed therein. Thus, in the preferred embodiment, the air chambers 322 are centered at 3-inch intervals along the length of pneumatic actuator assembly 310. They are separated from one another by plugs 324 which are integrally molded with the rest of the pneumatic actuator assembly 310 during the fabrication process. Each air chamber 322 is provided with a small opening 326 located at the top to which an air tube 328 is attached. Each air chamber 322 may be subjected to air of a selected pressure through the corresponding air tube 328. A number of pneumatic actuator assemblies 310 are located side-by-side in the cross-direction along the length of the metering element 302.

As the pneumatic actuator assembly 310 is disposed adjacent the bottom surface 332 of pocket 308 in aluminum support 304, and aluminum support 304 is pressed against adjustment screw assembly 334, as will be subsequently described, the inflation of an air chamber 322 in the pneumatic actuator assembly 310 will cause the portion of the surface 336 having guide ridges 312 and corresponding to the air chamber 322 to displace in the direction of the drum 300. The air chamber 322 therefore presses against piston 314 to which bar 302 is attached, pressing bar 302 in the vicinity of the particular air chamber 322 toward the web 301 and the drum 300, thereby adjusting the width of the slot 305 at that cross-directional position to change the thickness of the coating applied to the web 301. The displacement of the bar 302 relative to the drum 300, i.e., the pressure of bar 302 against the web 301 and the coating material thereon will vary as a function of the pressure within the air chamber 322 corresponding to that cross-directional position. By carefully controlling the air pressure in the air chambers 322 disposed at equally spaced cross-directional positions, control of the positioning of the bar 302 and hence the thickness of the coating applied can be achieved.

As in the previously described embodiments, a computer may be used to generate the control signals that are applied through an interface to the air chambers 322. In order to use the control signals generated by the computer to produce the required air pressures in each of the air chambers 322, a pneumatic interface 330 is used. The pneumatic interface 330 uses a current-to-pressure transducer and can simultaneously apply pneumatic pressures to a plurality of air chambers 322 in response to electrical control signals from the computer. Pneumatic interfaces are commercially available, for example, from Measurex Corporation, and their construction and method of operation will not be described as persons skilled in the art could fabricate pneumatic interfaces of appropriate specifications based on those commercially available.

The adjusting screw assemblies 334 are used in conjunction with the pneumatic actuator assemblies 310. Initially the air chambers 322 are inflated to a nominal pressure in the range where controlled variations in pressure produce desired displacements of the pistons 314 and therefore of the bar 302. The adjusting screw assemblies 334 are then optimally adjusting prior to a coating procedure. After the coating procedure has begun, further adjustments are made as necessary by variation of the pressures in the appropriate air chambers 322 up and down as has been described.

Configurations of the present invention using pneumatic pressures can be used with other metering elements, for example blades.

The present invention has been described above in terms of several presently preferred embodiments, so that an understanding of the present invention may be conveyed. However, there are many configurations for coaters that cannot be specifically considered herein but with which the present invention is applicable. The present invention should therefore not be seen as being limited to use with the particular coaters described herein, but rather, it should be understood that the present invention has wide applicability with respect to the applications of coatings, including sizings, to paper and other sheet materials by a wide variety of coaters. Such other configurations could be achieved by those skilled in the art in view of the descriptions herein.

I claim:

1. In a system for applying a coating material to web material, the system of the type in which web material from a continuous roll on which coating material has been placed is transported through a slot formed between a surface and a metering element, the metering element for pressing the web material on which coating material has been placed against said surface and removing excess coating material, the slot oriented in a cross-direction relative to the direction of transport of the web material and having a width at each cross-directional position that determines the [thickness] *amount* of the web material and coating material at said cross-directional position that is transported through said slot, the improvement, by which a preselected [thickness] *amount* of coating material is applied to the web material with the [thickness] *amount* regulated at a plurality of selected cross-directional positions while web material is being transported through said slot, comprising:

a metering element capable of flexion at said plurality of cross-directional positions so that the displacement of said metering element from said surface and hence the width of the slot is adjustable at least to some extent independently at each of said plurality of selected cross-directional positions, *wherein said metering element includes a bimetallic member whose displacement from the surface at any of the plurality of selected cross-directional positions is dependent upon temperature in the bimetallic member in the area of the selected cross-directional position*;

control means for generating, as web material is transported through said slot, a plurality of control signals corresponding to said plurality of selected cross-directional positions, each control signal having a value dependent upon the difference in [thickness] *the amount* of the web material before it is transported through said slot and the coated web material after it is transported through said slot at one of the plurality of selected cross-directional positions and dependent upon the preselected [thickness] *amount* of said coating material; and adjusting means coupled to said metering element and coupled to said control means for adjusting, at least to some extent independently, as web material is transported through said slot, the flexion of the metering element and thereby the width of the slot at each of said plurality of selected cross-directional positions, said adjusting means acting in response to the corresponding control signals in order to regulate the [thickness] *amount* of the coating material on the web material as it is transported through said slot *and wherein said adjusting means includes a means for varying temperature of the bimetallic member in the areas of the selected cross-directional positions.*

[2. The system of claim 1 wherein said metering element comprises a bimetallic member whose displacement from the surface at any of the plurality of selected cross-directional positions is dependent upon temperature in the bimetallic member in the area of said selected cross-directional position and wherein said adjusting means includes a means for varying temperature of the bimetallic member in the areas of the selected cross-directional positions.]

3. The system of claim [2] *1* wherein said metering element comprises a blade having an edge which forms one side of said slot and wherein said bimetallic member comprises a plurality of bimetallic tongue-like extensions corresponding to said plurality of selected cross-directional positions, the end of each tongue-like extension engaging said blade in the vicinity of one of the plurality of selected cross-directional positions, said bimetallic tongue-like extensions separated by grooves so that temperature in each bimetallic tongue-like extension can be varied within a range at least to some extent independently of temperature in other bimetallic tongue-like extensions, the end of each bimetallic tongue-like extension moving in response to temperature in said bimetallic tongue-like extension to vary the position of the blade and thereby the width of said slot in the vicinity of the corresponding selected cross-directional position, and wherein said means for varying temperature of the bimetallic member in the area of the selected cross-directional positions comprises separate means for varying temperature in each bimetallic tongue-like extension.

4. The system of claim [2] *1* wherein said bimetallic member has a side proximate to said slot, along which said one of the metal layers of said bimetallic member is formed into a blade having an edge forming one side of said slot, and wherein said means for varying temperature of the bimetallic member in the areas of the selected cross-directional positions comprises separately controllable heaters corresponding to each selected cross-directional position and located to provide heat to said bimetallic member in the area of each selected cross-directional position.

5. [The system of claim 1 wherein said metering element comprises] *In a system for applying a coating material to web material, the system of the type in which web material from a continuous roll on which coating material has been placed is transported through a slot formed between a surface and a metering element, the metering element for pressing the web material on which coating material has been placed against said surface and removing excess coating material, the slot oriented in a cross-direction relative to the direction of transport of the web material and having a width at each cross-directional position that determines the amount of the web material and coating material at said cross-directional position that is transported through said slot, the improvement, by which a preselected amount of coating material is applied to the web material with the amount regulated at a plurality of selected cross-directional positions while web material is being transported through said slot, comprising*:

a linear *metering element* member having one side forming a side of said slot, *the linear member being capable of flexion at said plurality of cross-directional positions so that the displacement of the linear member from said surface and hence the width of the slot is adjustable at least to some extent independently at each of said plurality of selected cross-directional positions*; and a bimetallic *metering element* member corresponding to each selected cross-directional position, each bimetallic member having an end coupled to said linear member at one of the selected cross-directional positions, said end controllably displaceable to move said linear member so that said one side of said linear member is displaced at said one of the selected cross-directional positions to vary the width of the slot;

*control means for generating, as web material is transported through said slot, a plurality of control signals corresponding to said plurality of selected cross-directional positions, each control signal having a value dependent upon the difference in the amount of the web material before it is transported through said slot and the coated web material after it is transported through said slot at one of the plurality of selected cross-directional positions and dependent upon the preselected amount of said coating material; and*

*adjusting means coupled to said control means for adjusting, at least to some extent independently, as web material is transported through said slot, the flexion of the linear member and thereby the width of the slot at each of said plurality of selected cross-directional positions, said adjusting means acting in response to the corresponding control signals in order to regulate the amount of the coating material on the web material as it is transported through said slot,* [and] wherein said adjusting means includes means for controllably applying heat to each bimetallic member to controllably displace said end.

6. The system of claim 5 wherein said linear member is a blade having an edge and said one side of said linear member is the edge of said blade.

7. The system of claim 5 wherein said linear member is a rod.

8. [The system of claim 1] *In a system for applying a coating material to web material, the system of the type in which web material from a continuous roll on which coating material has been placed is transported through a slot formed between a surface and a metering element, the metering element for pressing the web material on which coating material has been placed against said surface and removing excess coating material, the slot oriented in a cross-direction relative to the direction of transport of the web material and having a width at each cross-directional position that determines the amount of the web material and coating material at said cross-directional position which is transported through said slot, the improvement, by which a preselected amount of coating material is applied to the web material with the amount regulated at a plurality of selected cross-directional positions while web material is being transported through said slot, comprising:*

*a metering element capable of flexion at said plurality of cross-directional positions so that the displacement of said metering element from said surface and hence the width of the slot is adjustable at least to some extent independently at each of said plurality of selected cross-directional positions;*

*control means for generating, as web material is transported through said slot, a plurality of control signals corresponding to said plurality of selected cross-directional positions, each control signal having a value dependent upon the difference in amount of the web material before it is transported through said slot and the coated web material after it is transported through said slot at one of the plurality of selected cross-directional positions and dependent upon the preselected amount of said coating material; and*

*adjusting means coupled to said metering element and coupled to said control means for adjusting, at least to some extent independently, as web material is transported through said slot, the flexion of the metering element and thereby the width of the slot at each of said plurality of selected cross-directional positions, said adjusting means acting in response to the corresponding control signals in order to regulate the amount of the coating material on the web material as it is transported through said slot,* wherein said adjusting means comprises a pneumatic actuator corresponding to each selected cross-directional position, the pneumatic actuator including a member responsive to pneumatic pressure, said member coupled to said metering element at said cross-directional position to press on said metering element with a force dependent upon pneumatic pressure applied to said member and to thereby vary the width of the slot at said selected cross-directional position, the displacement of said metering element at each selected cross-directional position dependent upon the pneumatic pressure applied to the corresponding member.

9. The system of claim 8 wherein each said member responsive to pneumatic pressure comprises a pneumatic chamber, at least a portion of the wall of which is elastically displaceable in response to pneumatic pressure within the chamber.

10. The system of claim 9 wherein said chamber is formed of an elastomer material.

11. The system of claim 10 wherein a plurality of said chambers corresponding to adjacent said selected cross-directional positions are integrally formed.

12. The system of claim 1 wherein said control means includes:

a first web material [thickness] monitoring means for monitoring the [thickness] *amount* of the web material at each selected cross-directional position before the web material is transported through said slot and generating a first signal whose value is dependent upon the monitored [thickness] *amount*;

a second coated web material [thickness] monitoring means for monitoring the [thickness] *amount* of the *coated* web material at each selected cross-directional position after the web material is transported through said slot and generating a second signal whose value is dependent upon the monitored [thickness] *amount*; and a computer means for computing, using the values of said generated first and second signals and the value of said preselected [thickness] *amount* of said coating material, the values of said control signals.

13. The system of claim 12 wherein:

said first web material [thickness] monitoring means includes a first basis weight gauge and a means for sequentially translating said first basis weight gauge in a cross direction proximate to said web material so that said first basis weight gauge sequentially monitors the [thickness] *basis weight* of said web material at each selected cross-directional position before the web material is transported through said slot; and said second web material [thickness] monitoring means includes a second basis weight gauge and a means for sequentially translating said second basis weight gauge in a cross direction proximate to said web material so that said second basis weight gauge sequentially monitors the [thickness] *basis weight* of said coated web material at each selected cross-directional position after the web material is transported through said slot.

14. A method for applying a uniform [thickness] *amount* of a coating material to a web material from a continuous roll comprising *the steps of*:

selecting [a thickness] *an amount* of the coating material to be applied to said web material at each of a plurality of selected cross-directional positions;

monitoring the [thickness] *amount* of the web material at said plurality of selected cross-directional positions across said web material before coating material is placed on said web material and producing first signals representative thereof;

placing coating material on said web material;

transporting web material from said roll on which said coating material has been placed through a slot formed by a surface and a metering element to remove excess coating material placed on said web material, the separation of said metering element and said surface at each of the selected cross-direction positions determining the [total thickness] *amount* of said web material and coating material passing through said slot at that selected cross-directional position. *said metering element including a bimetallic member whose temperature sensitive movement controls the width of the slot at each of the selected cross-directional positions*;

monitoring the [thickness] *amount* of said web material and coating material at said plurality of selected cross-directional positions after said web material has been transported through said slot and producing second signals representative thereof;

comparing in a device the corresponding first and second signals to determine the [thickness] *amount* of coating material applied at each selected cross-directional position and producing third signals representative thereof;

generating fourth signals representing the said selected [thicknesses] *amounts*;

comparing in a device the corresponding third and fourth signals to determine the difference between the [thickness] *amount* of the coating material applied at each selected cross-directional position with the [thickness] *amount* of the coating selected to be applied, and producing control signals therefrom for each selected cross-directional position; and applying said control signals to corresponding means for controlling the [separation] *temperature* of said [metering element and said surface] *bimetallic member* at each selected cross-directional position while web material is being transported through said slot to change the [thickness] *amount* of the coating material applied in order that the coating material applied be the selected [thickness] *amount* at each selected cross-directional position.

*15. A method for applying a uniform amount of a coating material to a web material from a continuous roll comprising the steps of:*

*selecting an amount of the coating material to be applied to said web material at each of a plurality of selected cross-directional positions;*

*monitoring the amount of the web material at said plurality of selected cross-directional positions across said web material before coating material is placed on said web material and producing first signals representative thereof;*

*placing coating material on said web material;*

*transporting web material from said roll on which said coating material has been placed through a slot formed by a surface and a pneumatically controlled metering element to remove excess coating material placed on said web material, the separation of said metering element and said surface at each of the selected cross-directional positions determining the amount of said web material and coating material passing through said slot at that selected cross-directional position;*

*monitoring the amount of the web material and coating material at said plurality of selected cross-directional positions after the web material has been transported through said slot and producing second signals representative thereof;*

*comparing in a device the corresponding first and second signals to determine the amount of coating material applied at each selected cross-directional position and producing third signals representative thereof;*

*generating fourth signals representing the said selected amounts;*

*comparing in a device the corresponding third and fourth signals to determine the difference between the amount of the coating material applied at each selected cross-directional position with the amount of the coating selected to be applied, and producing control signals therefrom for each selected cross-directional position; and*

*applying said control signals to corresponding means for controlling the separation of said pneumatically controlled metering element and said surface at each selected cross-directional position while web material is being transported through said slot to change the amount of the coating material applied in order that the coating material applied be the selected amount at each selected cross-directional position.*

*16. A method for applying a uniform amount of a coating material to a web material from a continuous roll comprising the steps of:*

*selecting an amount of the coating material to be applied to said web material at each of a plurality of selected cross-directional positions;*

*monitoring the amount of the web material at said plurality of selected cross-directional positions across said web material before coating material is placed on said web material and producing first signals representative thereof;*

*placing coating material on said web material;*

*transporting web material from said roll on which said coating material has been placed through a slot formed by a surface and one side of a flexible coater blade to remove excess coating material placed on said web material, the separation of said one side and said surface at each of the selected cross-directional positions determining the amount of said web material and coating material passing through said slot at that selected cross-directional position;*

*monitoring the amount of the web material and coating material at said plurality of selected cross-directional positions after the web material has been transported through said slot and producing second signals representative thereof;*

*comparing in a device the corresponding first and second signals to determine the amount of coating material applied at each selected cross-directional position and producing third signals representative thereof;*

*generating fourth signals representing the said selected amounts;*

*comparing in a device the corresponding third and fourth signals to determine the difference between the amount of the coating material applied at each selected cross-directional position with the amount of the coating selected to be applied, and producing control signals therefrom for each selected cross-directional position; and*

*applying said control signals to corresponding means for preferentially heating the side of the blade opposite the first side so that the blade bends toward the surface at each selected cross-directional position while web material is being transported through said slot to change the amount of the coating material applied in order that the coating material applied be the selected amount at each selected cross-directional position.*

*17. A device for controlling the movement of a material, comprising:*

*a flexible metering element; and*

*a plurality of independently controllable pneumatic actuators, each actuator engaging the metering element at a selected cross-directional position along the length of the element for at least to some extent independently controlling the movement of the element at the selected cross-directional positions, wherein each pneumatic actuator includes a member responsive to pneumatic pressure, said member engaging the metering element at the selected cross-directional position to act on the element with a force dependent upon the pneumatic pressure applied to the member.*

*18. The device of claim 17, wherein the metering element is a coater blade adapted to control the amount of coating material applied to a sheet, the device further comprising:*

*a coating sensor adapted to sense the amount of coating material adhering to a sheet at a plurality of cross-directional positions across the sheet, wherein the sensor is further adapted to generate signals having values dependent upon the sensed coating amounts; and*

*adjusting means, operatively coupled to the sensor and to the pneumatic actuators, for adjusting, in response to the signals and at least to some extent independently, the pneumatic pressure applied to each member.*

*19. The device of claim 18, wherein the sensor includes a basis weight gauge and a means for sequentially translating the basis weight gauge in a cross-direction proximate to the sheet so that the basis weight gauge sequentially monitors the amount of coating at each selected cross-directional position after the sheet is coated.*

*20. A device for controlling the movement of a material, comprising:*

*a blade having a first major surface and a second major opposing surface, wherein the blade is a coater blade adapted to control the amount of coating material applied to a sheet;*

*a plurality of individually controllable heaters disposed at intervals along the length of the blade, at least one heater disposed adjacent to the first surface for preferentially heating the first surface relative to the second surface;*

*a coating sensor adapted to sense the amount of coating material adhering to the sheet at a plurality of cross-directional positions across the sheet, wherein the sensor is further adapted to generate signals having values dependent upon the sensed coating amounts; and*

*adjusting means, operatively coupled to the coating sensor and to the heaters, for adjusting, in response to the signals and at least to some extent independently, the heat generated by each of the heaters.*

*21. A device for controlling the movement of a material, comprising:*

*a blade having a first major surface and a second major opposing surface, wherein the blade is a coater blade adapted to control the amount of coating material applied to a sheet;*

*a plurality of individually controllable heaters disposed at intervals along the length of the blade, at least one heater disposed adjacent to the first surface for preferentially heating the first surface relative to the second surface;*

*a coating sensor adapted to sense the amount of coating material adhering to the sheet at a plurality of cross-directional positions across the sheet, wherein the sensor is further adapted to generate signals having values dependent upon the sensed coating amounts;*

*adjusting means, operatively coupled to the coating sensor and to the heaters, for adjusting, in response to the signals and at least to some extent independently, the heat generated by each of the heaters; and*

*wherein the sensor includes a basis weight gauge and a means for sequentially translating the basis weight gauge in a cross-direction proximate to the sheet so that the basis weight gauge sequentially monitors the amount of coating at each cross-directional position after the sheet is coated.*

*22. A device for controlling the movement of a material, comprising:*

*a bimetallic blade having first and second opposing major surfaces, wherein the side of the blade defined by the first surface is formed of one type of metal and the opposite side of the blade is formed of a different type of metal, wherein the blade is a coater blade adapted to control the amount of coating material applied to a sheet;*

*a plurality of individually controllable heaters disposed at intervals along the length of the blade, at least one heater disposed adjacent to the first surface for heating the blade;*

*a coating sensor adapted to sense the amount of coating material adhering to the sheet at a plurality of cross-directional positions across the sheet, wherein the sensor is further adapted to generate signals having values dependent upon the sensed coating amounts; and*

*adjusting means, operatively coupled to the coating sensor and to the heaters, for adjusting, in response to the signals and at least to some extent independently, the heat generated by each of the plurality of heaters.*

*23. A device for controlling the movement of a material, comprising:*

*a bimetallic blade having first and second opposing major surfaces, wherein the side of the blade defined by the first surface is formed of one type of metal and the opposite side of the blade is formed of a different type of metal, wherein the blade is a coater blade adapted to control the amount of coating material applied to a sheet;*

*a plurality of individually controllable heaters disposed at intervals along the length of the blade, at least one heater disposed adjacent to the first surface for heating the blade;*

*a coating sensor adapted to sense the amount of coating material adhering to the sheet at a plurality of cross-directional positions across the sheet, wherein the sensor is further adapted to generate signals having*

*values dependent upon the sensed coating amounts, wherein the sensor includes a basis weight gauge and a means for sequentially translating the basis weight gauge in a cross-direction proximate to the sheet so that the basis weight gauge sequentially monitors the amount of coating at each selected cross-directional position after the sheet is coated; and*

*adjusting means, operatively coupled to the coating sensor and to the heaters, for adjusting, in response to the signals and at least to some extent independently, the heat generated by each of the plurality of heaters.*

*24. A device for controlling the movement of a material, comprising:*

*a coater blade adapted to control the amount of coating material applied to a sheet;*

*bimetallic members disposed at selected cross-directional positions along the length of the blade, each bimetallic member having an end engaging the blade at one of the selected cross-directional positions, the end being controllably displaceable to move the blade so that the blade is displaced at one of the selected cross-directional positions;*

*an independently controllable heater, associated with each member, for controllably applying heat to each member to displace the end;*

*a coating sensor adapted to sense the amount of coating material adhering to the sheet at a plurality of cross-directional positions across the sheet, wherein the sensor is further adapted to generate signals having values dependent upon the sensed coating amounts; and*

*adjusting means, operatively coupled to the coating sensor and to the heaters, for adjusting, in response to the signals and at least to some extent independently, the heat generated by each of the heaters.*

*25. A device for controlling the movement of a material, comprising:*

*a coater blade adapted to control the amount of coating material applied to a sheet;*

*bimetallic members disposed at selected cross-directional positions along the length of the blade, each bimetallic member having an end engaging the blade at one of the selected cross-directional positions, the end being controllably displaceable to move the blade so that the blade is displaced at one of the selected cross-directional positions;*

*an independently controllable heater, associated with each member, for controllably applying heat to each member to displace the end;*

*a coating sensor adapted to sense the amount of coating material adhering to the sheet at a plurality of cross-directional positions across the sheet, wherein the sensor is further adapted to generate signals having values dependent upon the sensed coating amounts, and wherein the sensor includes a basis weight gauge and a means for sequentially translating the basis weight gauge in a cross-direction proximate to the sheet so that the basis weight gauge sequentially monitors the amount of coating at each selected cross-directional position after the sheet is coated; and*

*adjusting means, operatively coupled to the coating sensor and to the heaters, for adjusting, in response to the signals and at least to some extent independently, the heat generated by each of the heaters.*

* * * * *